Nov. 10, 1925. 1,560,663
W. CASTANIE
MOWING MACHINE
Filed Dec. 10, 1921 2 Sheets-Sheet 2
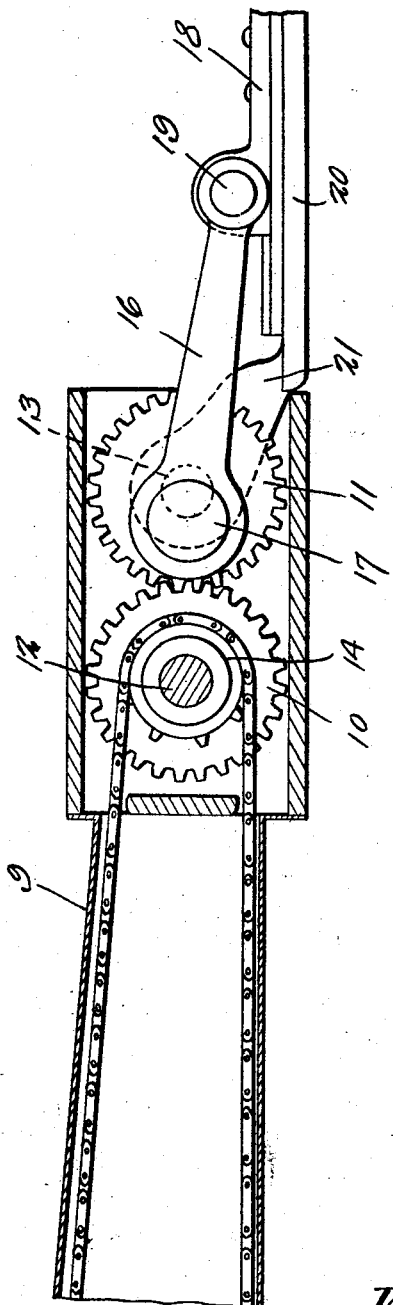
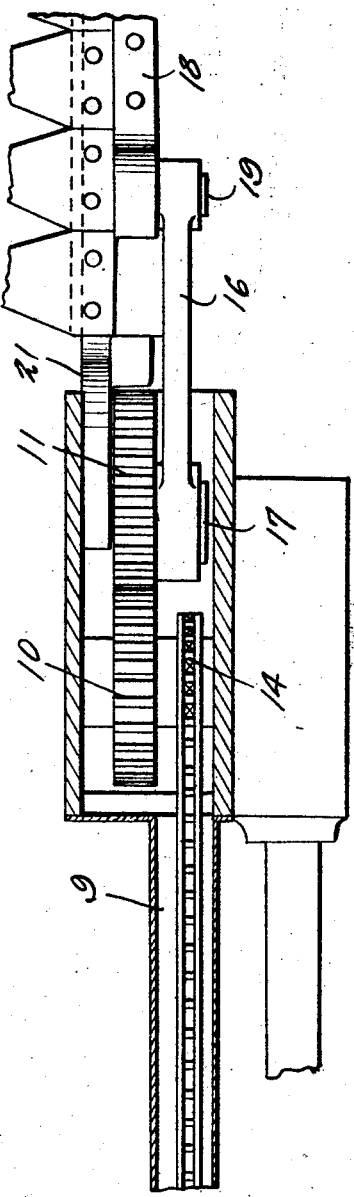
Inventor
W. Castanie
By C. A. Snow & Co.
Attorneys.

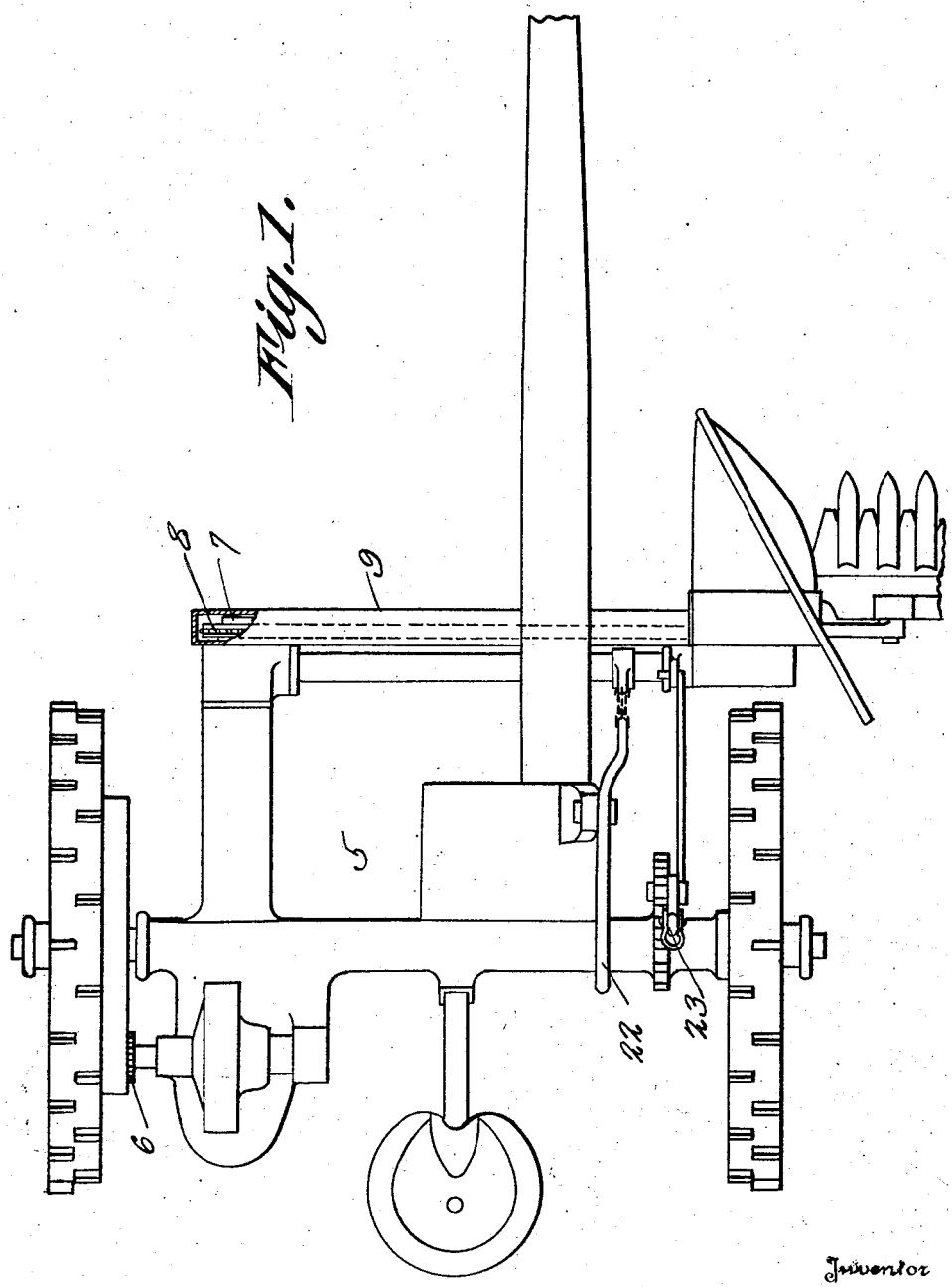

Patented Nov. 10, 1925.

1,560,663

UNITED STATES PATENT OFFICE.

WILLIAM CASTANIE, OF PORT ARTHUR, TEXAS.

MOWING MACHINE.

Application filed December 10, 1921. Serial No. 521,511.

*To all whom it may concern:*

Be it known that I, WILLIAM CASTANIE, a citizen of the United States, residing at Port Arthur, in the county of Jefferson and State of Texas, have invented a new and useful Mowing Machine, of which the following is a specification.

This invention has reference to mowing machine constructions, and more particularly to the cutter bar construction thereof.

The primary object of the invention is to provide novel means for transmitting reciprocating motion to the knife bar of the machine, to permit the cutter bar to float, and adjust itself to cut at various angles.

A further object of the invention is to provide a mowing machine which will mow with facility, along a bank or side hill.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a mowing machine disclosing a portion of the cutter bar.

Figure 2 is a sectional view through the gearing employed for operating the knife bar.

Figure 3 is a transverse sectional view through the gearing.

Referring to the drawings in detail, the reference character 5 designates a mowing machine, which is operated in the usual manner, and embodies a pinion 6 operating a suitable gear for rotating the shaft 7 on which the sprocket wheel 8 is mounted. A chain housing 9 extends across the forward end of the mowing machine and houses the sprocket wheel 8 at one end thereof, the opposite end of the housing providing a support for the gears 10 and 11, which are mounted on the shafts 12 and 13 respectively.

A sprocket wheel 14 is also connected to the shaft 12 for rotating the gear 10, which gear is in mesh with the gear 15. An operating rod 16 is eccentrically connected to the gear 11 as at 17, so that as the gear 11 rotates, the blade bar 18, which has connection therewith as at 19 is reciprocated to accomplish the cutting operation.

The guard bar 20 is formed with an extension 21 supported on the shaft 13 to permit the guard bar and cutter bar to be adjusted vertically to assume various angles with respect to the body portion of the mower. The mower is formed with the usual controlling lever 22, whereby the cutter bar and guard bar may be raised and lowered at the will of the operator. The mower is also provided with the usual lever 23 for tilting the cutter bar at the will of the operator.

From the foregoing it will be seen that due to the construction and arrangement of gears 10 and 11, the guard bar and cutter bar may be moved to various angles to permit the mower to be used on side hills or the like.

Having thus described the invention, what is claimed as new is:—

In a device of the character described, a gear housing, a shaft extending through the gear housing, a gear mounted on the shaft, a sprocket on the shaft to move therewith, a shaft extending from one wall of the housing, a gear on the last mentioned shaft and meshing with the gear of the first mentioned shaft, a guard bar mounted to swing on the last mentioned shaft, a movable cutting member operating over the guard bar, a pin eccentrically mounted on the last mentioned gear, an operating rod connecting the pin and movable cutting member to transmit movement thereto, and a chain operating over the sprocket to transmit rotary movement to the gears and movable cutting member.

In testimony that I claim the foregoing as my own, I have hereto affixed my signature.

WILLIAM CASTANIE.